United States Patent [19]
Seitz

[11] 4,050,561
[45] Sept. 27, 1977

[54] CONVEYOR FOR STACKING CASES IN A RUN-THROUGH STORAGE STRUCTURE

[76] Inventor: Peter Seitz, Bosgrunder Weg 64, 6550 Bad Kreuznach, Germany

[21] Appl. No.: 705,028

[22] Filed: July 14, 1976

[30] Foreign Application Priority Data

July 24, 1975 Germany .............................. 2533113

[51] Int. Cl.² .............................................. B65G 13/00
[52] U.S. Cl. ..................................... 193/35 R; 193/37
[58] Field of Search ................ 193/35 R, 35 C, 35 F, 193/35 J, 37; 29/116 R; 198/780; 308/3.6, 20

[56] References Cited

U.S. PATENT DOCUMENTS

| 2,717,071 | 9/1955 | Cook | 193/35 R X |
| 3,509,978 | 5/1970 | Bedford | 193/35 R |
| 3,559,782 | 2/1971 | Lesley | 193/37 |

Primary Examiner—Johnny D. Cherry
Assistant Examiner—James L. Rowland
Attorney, Agent, or Firm—Webb, Burden, Robinson & Webb

[57] ABSTRACT

A conveyor for stacking cases in a run-through storage structure comprises a bearing cage into which snap the ends of an axle carrying a roller, the bearing cage having a projection engaging into an opening in a frame member of the storage structure and being retained therein by a complementary projection engaging into the same opening from the opposite side of the frame member.

7 Claims, 5 Drawing Figures

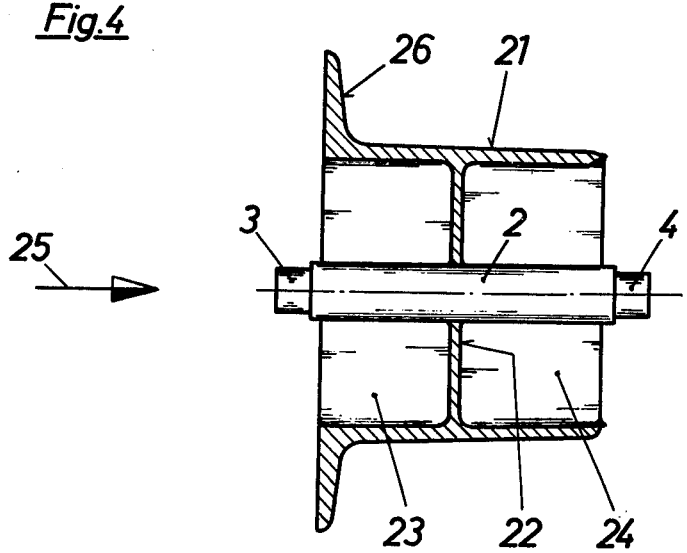
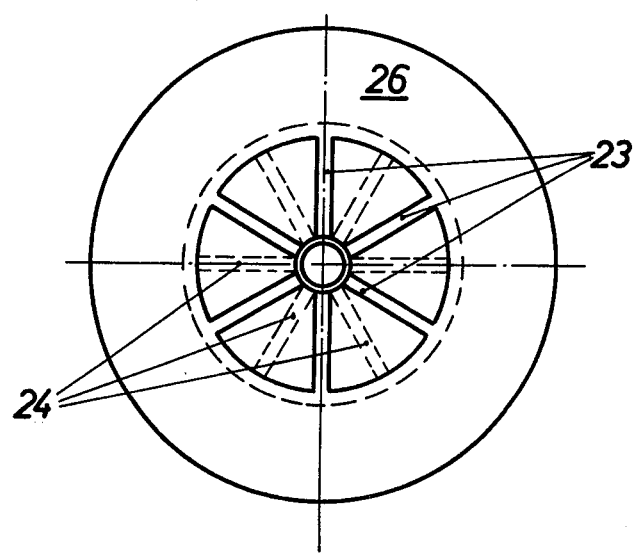

CONVEYOR FOR STACKING CASES IN A RUN-THROUGH STORAGE STRUCTURE

The invention relates to a conveyor for stacking cases in a run-through storage structure.

It is known, in the case of large storage structures in industry and commerce, to support stacking cases or original cartons, standing one above the other in a run-through storage structure, by their two lower side edges, on rollers which are fastened to frame members of the structure. The rollers allow forward movement, under the force of gravity, of each stacking box or carton in the structure from the rear forward, in other words, from a loading point to a removal point. Since the rollers are often exposed to a considerable weight loading, they have to be built in a correspondingly stable manner and be fastened in large numbers to the frame members. The known rollers usually comprise a substantially cylindrical shell having a wheel flange made of plastics material and two ball bearings. A steel axle, projecting at one side, upon the installation of the roller, inserted into corresponding recesses in the frame members and fixed firmly thereto. The installation of these rollers in the case of fairly large storage installations is, accordingly, extremely time-consuming and involves a high labor cost.

The problem underlying the invention is to improve the known bearing conveyors in such a way as to achieve a simplified construction whereby the cost thereof is reduced and, moreover, the time involved in installation is substantially shortened, as compared with the prior known proposals.

In accordance with the invention, this problem is solved in that the roller engages by two axle ends in journal bearing recesses of a bearing cage which engages, at one outer side, by a projection thereof through an opening in a frame member and is secured in this position by a complementary projection which engages with the projection, the said complementary projection being either part of a correspondingly shaped outer side surface of a second similar bearing cage, or of a shape serving only as a locking member. In this construction, the roller is no longer supported at one axle end and secured to the frame member, but is supported at two axle ends and the fastening is effected by engaging one outer side of the bearing cage with the frame member. The use of metallic ball bearings and axles is thus completely eliminated and all the parts, which can be simplified in their construction, can be injection-moulded entirely from plastics material.

In a preferred embodiment of the conveyor of the invention, a roller engages by its said two axle ends in journal bearing recesses of a bearing cage. The cage has, at one outer side, a hook-shaped projection which, together with a correspondingly profiled hook-shaped projection of the second bearing cage or the locking plate, engages through an opening of the frame member. The hook-shaped projections are in abutting juxtaposition by their reverse sides and embrace the edges of the opening at two of its opposite side edges.

The bearing cage has advantageously on two of its oppositely lying outer sides, alternate and respective projections for cooperating with the opening in the frame member. With such an arrangement only a single uniform type of bearing cage needs to be provided; in installing the roller, two of the cages are assembled together in side-inverted manner.

Advantageously, the bearing cage consists of a plastics material and the projection of the one bearing cages interengages by a resiliently deformable nose, defining an undercut, with a similar resiliently deformable nose of the other bearing cage. This arrangement uses the elastic property of the plastics material to achieve a self-locking mutual fastening of the two bearing cages.

Conveniently, each sliding bearing recess of each bearing cage retains the respective runner axle and by two oppositely directed noses defining a gap which is narrower than the diameter of the axle ends, so that the latter have to be snapped through such gaps and a simple connection between roller and bearing cage is achieved.

The roller, consisting exclusively of a plastics material, preferably comprises a roller axle which is connected to a roller shell by a radially extending spoked solid disc and a plurality of axially-extending spoked webs emanating therefrom.

These spoke webs may, to increase the strength, be arranged so as to be rotationally offset relative to one another in the axial direction at each side of the centrally disposed spoked solid disc.

One embodiment of the invention will now be described in detail, by way of example with reference to the accompanying drawings, in which:

FIG. 4 is a longitudinal section through one of the rollers of FIG. 1; and

FIG. 5 is a side view of the rollers of FIG. 4.

Figure 1:
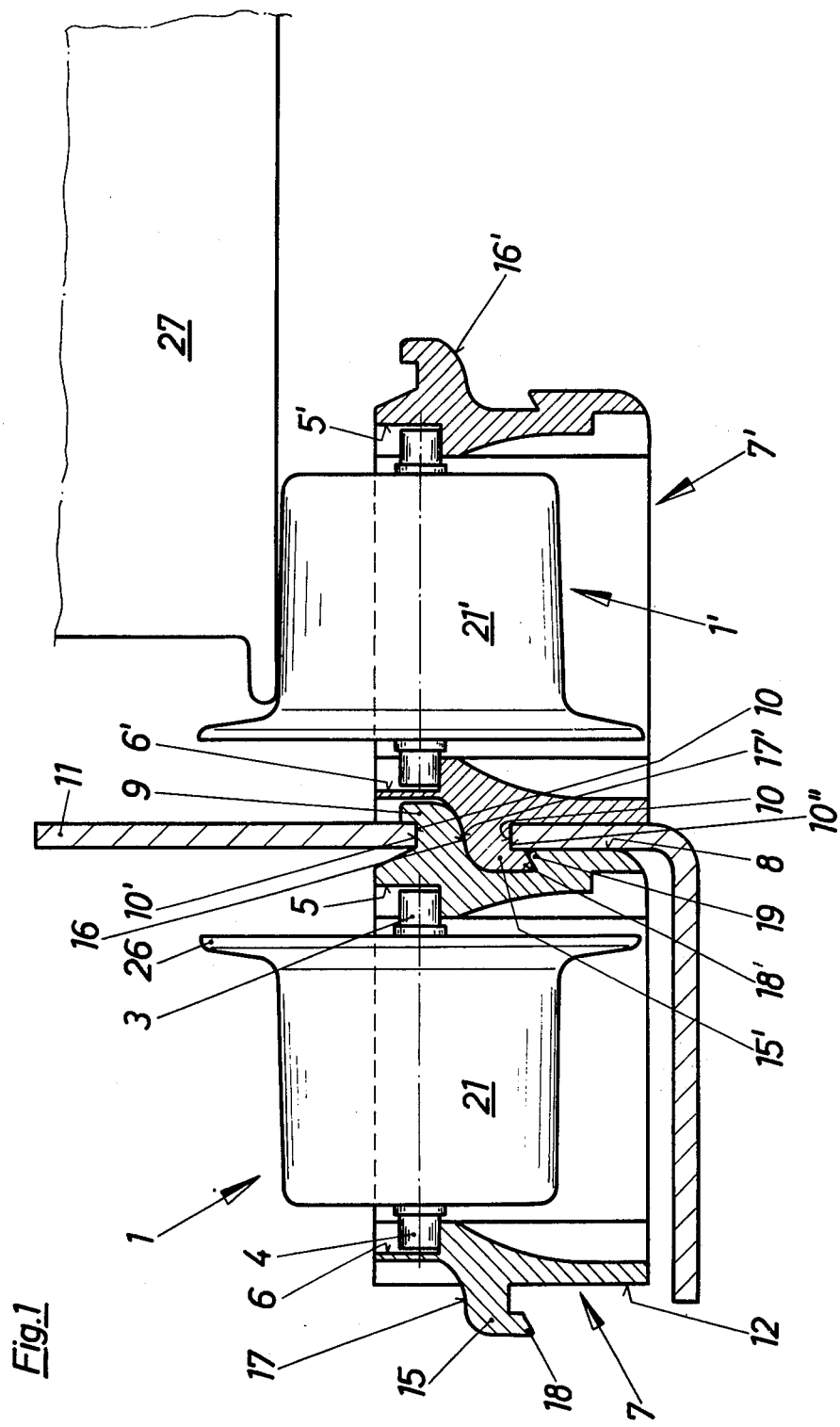
FIG. 1 is a part-sectional side view illustrating two of the rollers of the invention assembled in place in a frame member.

Of a run-through storage structure with which the invention is concerned, FIG. 1 shows only one of a plurality of frame members 11, to the two opposite sides of which respective series of rollers 21 and 21' are fastened. Stacking cases or original cartons, of which one is shown at 27, are supported by their lower longitudinal edges on two rows of such rollers and can therefore move within the run-through storage structure from the rear forward under the force of gravity, since the frame members have, by corresponding construction of the structure, a slight gradient of about 2 to 4 percent.

In contrast to the known rollers which are located directly by an axle, projecting at the one side, into an opening 10 in the frame member 11 and are bolted in place, the roller 21 (or 21') in the arrangement of the invention comprises respective bearing cages 7, 7' which support the respective roller axles 2 at their two axle ends 3 and 5 in correspondingly shaped journal bearing recesses 5 and 6. The cage 7 is fastened, at its one outer side 8, to the frame member 11 by simple plugin connection.

The bearing cage 7 has, at this side, a hook-shaped projection 9, which embraces the upper edge 10' of the opening 10 of the frame member 11. The oppositely lying outer side 12 of the other bearing cage 7' also has a hook-shaped projection 15 which, however, embraces the lower edge 10" of the opening 10 of the traverse 11. The reverse sides 16 and 17 of the two projections 9 and 15 are correspondingly profiled and abut tightly against one another. In this way any wobbling of two assembled bearing cages 7, 7', in the opening 10, is avoided.

It is to be noted that the projection 15 has, at its free end, a protruding resiliently deformable nose 18 which defines an undercut and engages behind a correspondingly shaped further similar nose 19 at the other side of the bearing cage. In this way the two assembled bearing cages 7 and 7' are permanently secured.

Figure 2:
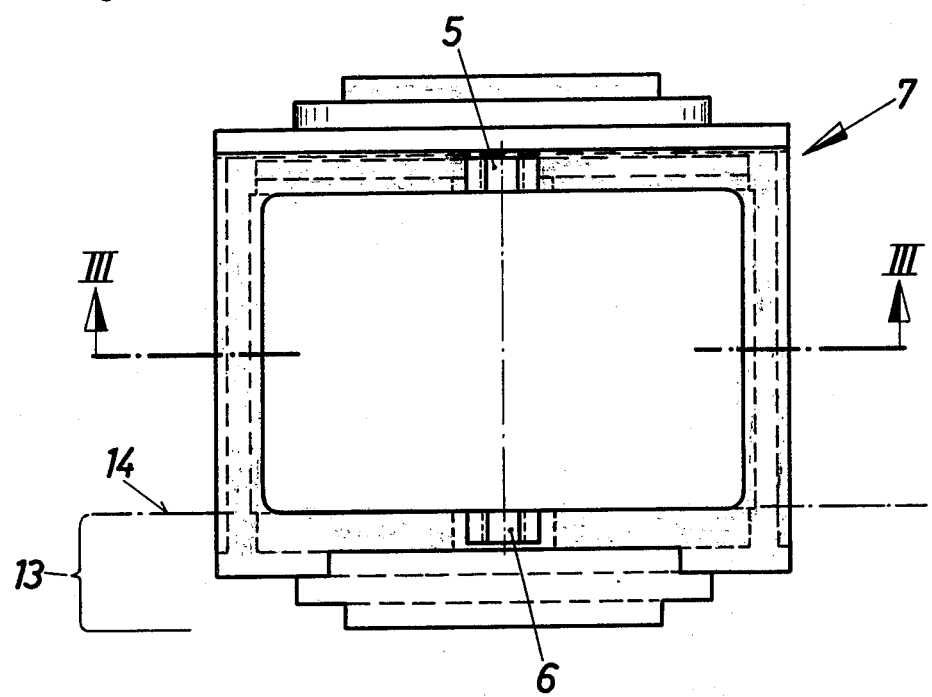
FIG. 2 is a plan view of one of the bearing cages of FIG. 1.

In special cases one can, when assembling only a single roller in place, make use of a shape 13 serving only as a locking member which can be understood from FIG. 2 and is obtained by severing one side wall from a bearing cage 7 along a cutting line 14. In this case, use is made not of two identically designed bearing cages assembled together but of one bearing cage and the locking member 13.

Figure 3:
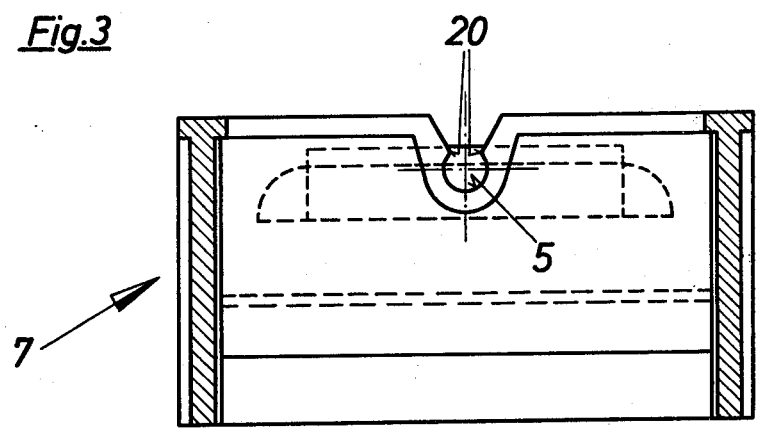
FIG. 3 is a side view of the bearing cage.

In FIG. 3 it is shown that the journal bearing recesses 5 and 6 each have two oppositely directed resiliently deformable noses 20, 20 which are spaced-apart by a spacing less than the diameter of the axle ends 2, 3 so that the axle ends 2, 3 have to be snapped through the gap between the noses which then retain the axle ends 3 and 4.

FIGS. 4 and 5 show the construction of the roller which comprises a cylindrical shell 21 having a flange 26, the axle 2 with the two axle ends 3 and 4, and a radially extending spoked solid disc 23, 24. The spoke webs 23 and 24, which are arranged at each side of the centrally disposed spoked solid disc 22, can advantageously be rotationally offset relative to one another in the axial direction, which increases the stability and carrying capacity of the runner.

The cost of making the runner described above is substantially reduced, in comparison with the known proposals, in that only two simply constructed plastics material parts (namely a roller and a bearing cage) have to be used and be assembled which can be done easily by hand. Installation time is reduced because screwing or bolting is eliminated and the simple and rapid fitting the one into the other takes about one-tenth of the previously necessary installation time. Since the conveyors of the invention can be constructed to relatively small dimensions, with the same total installation height, for example, instead of 8 shelf levels, now 10 shelf levels can be provided, which increases once more by 25% the usefulness of a storage shelf structure constructed in this way, apart from the substantially lower investment costs.

I claim:

1. A conveyor for stacking cases in a storage structure or the like comprising:
    a frame having spaced elongated members with a plurality of openings thereof,
    a plurality of bearing cages, said bearing cages having at least one shaped projection extending to one side,
    a plurality of locking members each having a complementary shaped projection, said projections on said bearing cages and complementary projections on said locking members arranged to interengage through said openings in said frame members to secure the bearing cages to said members,
    a plurality of rollers having an axle therethrough extending to each side thereof, said axles being insertable in the journal bearings of said bearing cages.

2. A conveyor assembly according to claim 1 wherein each bearing cage is provided with a shaped projection and a complementary shaped project on opposite faces and a cage functions as a locking member, whereby cages are secured to opposite sides of the frame member through openings therein.

3. A conveyor as claim 2 wherein each said projection and complementary projection are hook-shaped, said projections arranged to abut against one another by their reverse sides and embrace the material of said members around said openings at two opposite edges of said openings.

4. A conveyor as set forth in claim 3 wherein each said bearing cage is of plastics material, and each said projection has a nose which snaps into an undercut defined by the said complementary projection.

5. A conveyor as set forth in claim 1 wherein each said journal bearing recess has two oppositely directed noses defining a gap narrower than the diameter of the respective axle end for said axle end to be snapped therebetween for retention in said bearing cage.

6. A conveyor as set forth in claim 1 wherein said axle carries a roller shell which is connected to said axle by a radially extending spoke disc and by a plurality of axially extending spoke webs emanating therefrom.

7. A conveyor as set forth in claim 6 wherein said spoke webs are rotationally offset relative to one another in the axial direction at each side of said spoke disc, which is centrally disposed.

* * * * *

UNITED STATES PATENT AND TRADEMARK OFFICE
CERTIFICATE OF CORRECTION

PATENT NO. : 4,050,561

DATED : September 27, 1977

INVENTOR(S) : Peter Seitz

It is certified that error appears in the above-identified patent and that said Letters Patent are hereby corrected as shown below:

Column 1 Line 22 After "side," insert --is,--.

Claim 1 - Column 4 Line 4 "thereof" should read --therein--.

Signed and Sealed this

*Twenty-seventh* Day of *December 1977*

[SEAL]

Attest:

RUTH C. MASON
*Attesting Officer*

LUTRELLE F. PARKER
*Acting Commissioner of Patents and Trademarks*